2,912,470
Patented Nov. 10, 1959

2,912,470
METHOD OF DEHYDROHALOGENATING HALOGENATED HYDROCARBONS

Charles E. Kircher, Jr., Detroit, and Robert J. Jones, Dearborn, Mich., assignors to Detrex Chemical Industries, Inc.

No Drawing. Application January 4, 1956
Serial No. 557,241

5 Claims. (Cl. 260—654)

It is an object of this invention to provide an improved process for dehydrohalogenating halogenated hydrocarbons, and to provide a new catalyst which retains its catalytic activity for the dehydrohalogenation reaction much longer than conventional, commercially accepted catalysts. Other objects and advantages of this invention will further appear hereinafter.

In describing our invention, a catalyst is defined as a substance which brings about a change in the speed of reaction without itself changing in chemical identity. A catalyst poison is defined as a substance which reduces or destroys the efficiency of a catalyst.

It is a well known fact that catalysts may be simple more or less pure substances or may be extremely complex mixtures or combinations of substances which may or may not be held or carried on a supporting medium. The supporting medium is then called the catalyst carrier or catalyst support.

It is well known in the art to dehydrohalogenate halogenated hydrocarbons in the gaseous phase by passing the heated halogenated hydrocarbon through a bed of activated carbon impregnated with one or more metal salts. A typical reaction for producing trichlorethylene is

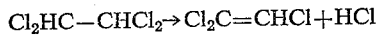
$$Cl_2HC-CHCl_2 \rightarrow Cl_2C=CHCl+HCl$$

Various dehydrohalogenation catalysts have been found suitable, for example, mercuric chloride, barium chloride, and other metal chloride salts deposited on carbon or some other carrier. In some cases two or more metal salts have been combined in the catalyst and have been found to have greater catalytic activity than either metal salt alone. However, it has been invariably found in commercial operations that the catalyst gradually loses activity or efficiency during service and must eventually be discarded. Loss of activity is usually the result of physical or chemical changes in the catalyst which take place during its service life. A particularly potent cause for loss of activity can be the development, formation or accumulation of certain agents called poisons in the catalyst. Processes involving the catalytic dehydrochlorination of various types of chlorinated hydrocarbons, such as acetylene tetrachloride and other saturated chlorinated and halogenated hydrocarbons have always been subject to loss of catalyst activity during service life. In many cases this has been a limiting factor in the operation.

It has now been discovered that iron, usually in the oxidized state, which is present in measurable quantities in all commercially available carbon, acts as a catalyst poison in the catalytic dehydrohalogenation of halogenated hydrocarbons. It has been observed that the effective life of metal chloride activated carbon catalysts is greatly lengthened by subjecting the carbon to a preliminary treatment removing substantially all the iron content from the carbon.

It has further been discovered that, when the activated carbon catalyst is treated for iron removal, the iron-free carbon alone has a much greater catalytic activity than the same iron-free carbon impregnated with a metal chloride such as mercuric chloride or barium chloride, for example. In fact, the catalytic activity of iron-free carbon alone has been found to be about twice the catalytic activity of iron-free carbon impregnated with barium chloride. However, in either case, the loss of activity during service is so small that for practical purposes it is negligible. Accordingly, this discovery represents an important factor economically in the commercial production of dehydrohalogenation products, for example, the production of trichlorethylene by the catalytic dehydrochlorination of acetylene tetrachloride, since catalyst costs have heretofore represented significant items.

In accordance with this invention, commercial activated carbon containing iron is treated with a substance which dissolves iron or iron oxides, and the dissolved iron compounds are leached or washed out of the carbon. For example, the carbon may be immersed in a dilute aqueous solution of hydrochloric acid or sulfuric acid, and then thoroughly washed with water to remove iron. Other methods of removing iron from activated carbon will readily occur to persons skilled in the art.

Dehydrochlorination processes may be practiced in a variety of ways, but the operation is preferably carried out at or slightly above atmospheric pressure since higher pressures tend to retard the decomposition reaction. The dehydrochlorination reaction usually takes place at elevated temperatures with the chlorinated hydrocarbon in the gaseous state, the chlorinated hydrocarbon being passed over the surfaces of particles of activated carbon. While in many instances the reactors of the prior art have been provided with internal iron or steel surfaces which were exposed to the chlorinated hydrocarbon, it is preferred in accordance with this invention to utilize a reactor having an internal surface which is substantially free of iron. Glass and other similar iron-free reaction systems avoid the accumulation of iron in the catalyst, particularly when the reactor must be opened for catalyst replacement since rust on an iron surface can act as a poison on new catalyst placed in contact with it, all as heretofore described.

The temperature of the dehydrochlorination reaction varies with the starting material. However, for most halogenated hydrocarbons, the working temperature may be as low as about 200° C. and may range upwardly to temperatures of 800° C. or above.

The gaseous products discharged from the reactor may be cooled to condense the dehydrohalogenated hydrocarbon and then scrubbed with water to separate the hydrogen halide. After separation, the dehydrohalogenated hydrocarbon may be purified by distillation, etc., and the unreacted starting material recycled.

Example 1

Iron-free carbon catalyst is prepared by immersing commercial activated carbon in a 0.1 N solution of HCl at 80° C. for four hours, removing the carbon from the solution, and leaching with water by immersion three successive times for one hour each. The catalyst is then thoroughly dried.

Acetylene tetrachloride is heated to a temperature of 225° C. and passed continuously into a glass-lined reactor through a catalyst bed wherein the catalyst consists of the iron-free carbon prepared as indicated above. The reaction products are cooled, separating the trichlorethylene product and then washed with water, dissolving the hydrogen chloride gas. After continuous operation for more than 700 hours, the activity of the catalyst is substantially unchanged as indicated by a nearly constant conversion of the feed material. More than 1300 pounds of trichlorethylene per pound of catalyst may be produced without substantial reduction of catalyst activity.

Example 2

Following the procedure of Example 1, but substituting ordinary commercial activated charcoal as a catalyst, containing 1.5% iron expressed as $Fe_2O_3$, and impregnated with $BaCl_2$, it was possible to produce only 100 pounds of trichlorethylene per pound of catalyst, before the catalytic activity had fallen to a level where it became necessary to discard the catalyst.

Example 3

Following the procedure of Example 2, utilizing ordinary commercial activated charcoal containing about 1.5% iron expressed as $Fe_2O_3$, free of any added metal chloride, the effective life of the catalyst was essentially the same as that of the catalyst of Example 2. Similar activated charcoal, treated by saturation with dilute HCl followed by leaching with water and having a resultant iron content below .02% expressed as $Fe_2O_3$, was impregnated with $BaCl_2$ and was tested as in Example 2. The catalyst had an effective life of more than 1200 hours as against 10 hours for the catalyst of Example 2.

In referring herein to "iron-free" carbon it is intended to include carbon containing trace proportions of iron which do not adversely affect the life or activity of the catalyst. For example, iron contents as high as .02% expressed as $Fe_2O_3$, are permissible, although it is preferred to keep the iron content at an absolute minimum since even small quantities of iron act as catalytic poisons.

Although it has heretofore been suggested to treat an activated carbon catalyst base containing iron or iron compounds with hydrogen chloride gas either before or during its use in a reactor, such treatment has a detrimental rather than a beneficial effect. It does not remove the iron from the activated carbon. Contacing the iron or iron compounds with hydrogen chloride gas, either hot or cold, either has no effect or the hydrogen chloride may react with metallic iron or iron compounds to produce iron chloride. As iron chloride, the iron is in its most active condition, and is a potent catalyst poison. This invention differs sharply from the procedure heretofore suggested, in that the iron is removed from the carbon to provide a carbon catalyst which is substantially free of iron or iron salts, including iron chlorides. While a dilute aqueous solution of hydrochloric acid is an excellent solvent for iron and iron compounds, hydrogen chloride gas does not attack iron to any significant extent, nor would it effect the removal of iron from the carbon even if it did attack the iron. It has been observed that even the continuous presence of hydrogen chloride gas in the dehydrochlorination reaction mixture does not prevent the rapid poisoning of the catalyst if iron or iron compounds are present.

Although specific chlorinated hydrocarbons have been discussed herein for the sake of clarity, it should be appreciated that the invention is uniformly applicable to the dehydrohalogenation of a wide variety of halogenated hydrocarbons including acetylene tetrachloride, acetylene tetrabromide, acetylene tetrafluoride, ethylene dichloride, ethyl bromide, vinyl bromide, vinylidine chloride, acetone dibromide, cyclohexyl chloride, and the like. Some halogen compounds, such as the fluorides, present special problems but for all the halogens the catalytic activity is greatly improved by utilizing an iron-free catalyst in accordance with this invention. Such hydrocarbons contain an aliphatic or alicyclic portion including the structure

wherein X represents halogen.

It will further be appreciated that various methods of removing iron from carbon may be resorted to, and that other equivalents may be substituted, all without departing from the spirit and scope of the invention as defined in the appended claims.

Having thus described our invention, we claim:

1. In a method of catalytically dehydrohalogenating a saturated halogenated hydrocarbon in the presence of an activated carbon catalyst, said activated carbon normally containing iron in an amount sufficient to poison said activated carbon catalyst, the steps which comprise chemically removing iron impurities from the activated carbon catalyst and contacting said hydrocarbon in the gaseous state with the resulting treated activated carbon catalyst.

2. The method according to claim 1 wherein said chemical removal step comprises immersing the activated carbon catalyst in a dilute aqueous solution of an acid selected from the group consisting of hydrochloric and sulfuric, and subsequently washing the acid solution and dissolved impurities from the activated carbon catalyst with water.

3. The method according to claim 2 wherein the chemical treatment of said activated carbon is continued until said catalyst contains less than .02% by weight of iron expressed as $Fe_2O_3$.

4. In a method of producing trichlorethylene from acetylene tetrachloride by means of catalytic dehydrohalogenation, the steps which comprise chemically removing substantially all iron impurities from an activated carbon catalyst, passing said acetylene tetrachloride through the treated activated carbon catalyst thereby producing gaseous trichlorethylene and hydrogen chloride, and separating said hydrogen chloride from said trichlorethylene.

5. In a method of catalytically dehydrohalogenating a halogenated hydrocarbon, the steps which comprise providing a reaction container having an iron free inner surface, chemically removing substantially all iron compounds from an activated carbon catalyst, placing said treated activated carbon catalyst within said reaction container, heating the halogenated hydrocarbon, and passing said halogenated hydrocarbon in the vapor state through said container in contact with said treated activated carbon catalyst.

References Cited in the file of this patent

UNITED STATES PATENTS

| | | |
|---|---|---|
| 1,188,936 | Hershman | June 27, 1916 |
| 1,919,886 | Herrmann | July 25, 1933 |
| 2,300,600 | Steely et al. | Nov. 3, 1942 |
| 2,323,226 | Levine et al. | June 29, 1943 |
| 2,749,359 | Calkins et al. | June 5, 1956 |
| 2,755,319 | Baggett | July 17, 1956 |
| 2,787,528 | Dorenfeld | Apr. 2, 1957 |

FOREIGN PATENTS

| | | |
|---|---|---|
| 302,321 | Great Britain | Jan. 30, 1930 |